(12) United States Patent
Parker et al.

(10) Patent No.: US 8,974,137 B2
(45) Date of Patent: Mar. 10, 2015

(54) QUICK COUPLER (75) Inventors: Jeffrey Parker, Fuquay-Varina, NC (US); H. Patrick Gaines, Cary, NC (US)

(73) Assignee: Caterpillar Inc., Peoria, IL (US)

( * ) Notice: Subject to any disclaimer, the term of this patent is extended or adjusted under 35 U.S.C. 154(b) by 322 days.

(21) Appl. No.: 13/334,315

(22) Filed: Dec. 22, 2011

(65) Prior Publication Data

US 2013/0160269 A1     Jun. 27, 2013

(51) Int. Cl.
*F16B 2/10* (2006.01)

(52) U.S. Cl.
USPC ............... 403/322.3; 403/322.4; 414/723; 37/468

(58) Field of Classification Search
CPC ..... E02F 3/3604; E02F 3/3609; E02F 3/3618; E02F 3/3663; E02F 3/3668; E02F 3/3672
USPC ............. 403/31, 321, 322.1, 322.3, 322.4; 414/723; 37/468
See application file for complete search history.

(56) References Cited

U.S. PATENT DOCUMENTS

| | | | |
|---|---|---|---|
| 3,556,323 A | | 1/1971 | Heimmermann |
| 3,961,812 A | * | 6/1976 | Von Allworden ............ 172/275 |
| 4,214,840 A | | 7/1980 | Beales |
| 4,295,287 A | | 10/1981 | Natzke et al. |
| 4,373,852 A | | 2/1983 | Mauer |
| 4,417,844 A | | 11/1983 | de Pingon |
| 4,480,955 A | | 11/1984 | Andrews et al. |
| 4,625,988 A | | 12/1986 | Witchey et al. |
| 4,632,595 A | | 12/1986 | Schaeff |
| 4,779,364 A | | 10/1988 | Holmdal |
| 4,790,084 A | | 12/1988 | Anderson et al. |
| 4,846,624 A | | 7/1989 | Hohn |
| 4,881,867 A | | 11/1989 | Essex et al. |
| 4,906,161 A | | 3/1990 | Weyer |
| 4,955,779 A | | 9/1990 | Knackstedt |
| 4,958,981 A | | 9/1990 | Uchihashi |
| 5,010,962 A | | 4/1991 | Bloom, Jr. |
| 5,024,010 A | | 6/1991 | Hulden |

(Continued)

FOREIGN PATENT DOCUMENTS

| | | |
|---|---|---|
| EP | 1318242 | 6/2003 |
| JP | 09209391 | 8/1997 |

(Continued)

OTHER PUBLICATIONS

"Earth-moving—Quick Couplers—Safety" Draft International Standard ISO/DIS 13031 © International Organization for Standardization (2011).

*Primary Examiner* — Daniel P Stodola
*Assistant Examiner* — Josh Skroupa
(74) *Attorney, Agent, or Firm* — John P. Wappel; Miller, Matthias & Hull LLP (57) ABSTRACT

A quick coupler for connecting an implement to a machine. The quick coupler including a frame, a first jaw pivotally connected to the frame and movable between an open position and a closed position, a second jaw pivotally connected to the frame and movable between an open position and a closed position, and a lock system connected to the first jaw and the second jaw. The lock system includes a first linkage pivotally connected to the frame and to the first jaw, a second linkage pivotally connected to the first linkage and to the second jaw, and a drive member connected to the first linkage and configured to selectively operate the lock system between an unlocked position and a locked position.

11 Claims, 7 Drawing Sheets

(56) References Cited

U.S. PATENT DOCUMENTS

| | | |
|---|---|---|
| 5,082,389 A | 1/1992 | Balemi |
| 5,107,610 A | 4/1992 | Fusco |
| 5,108,252 A | 4/1992 | Gilmore, Jr. et al. |
| 5,110,254 A | 5/1992 | Aubrey |
| 5,125,788 A | 6/1992 | Stenger |
| 5,141,385 A | 8/1992 | Tibbatts et al. |
| 5,145,313 A | 9/1992 | Weyer |
| 5,147,173 A | 9/1992 | Fauber et al. |
| 5,179,794 A | 1/1993 | Ballinger |
| 5,195,865 A | 3/1993 | Koehl |
| 5,222,695 A | 6/1993 | Lake |
| 5,237,762 A | 8/1993 | Sandberg |
| 5,242,258 A | 9/1993 | Weyer |
| 5,256,026 A | 10/1993 | Kishi |
| 5,324,162 A | 6/1994 | Kishi |
| 5,332,353 A | 7/1994 | Arnold |
| 5,333,400 A | 8/1994 | Sonerud |
| 5,350,250 A | 9/1994 | Nagler |
| 5,360,313 A | 11/1994 | Gilmore, Jr. et al. |
| 5,382,110 A | 1/1995 | Perotto et al. |
| 5,394,630 A | 3/1995 | Moinat |
| 5,400,531 A | 3/1995 | Brown |
| 5,415,235 A | 5/1995 | Gebauer |
| 5,423,625 A | 6/1995 | Gebauer et al. |
| 5,431,528 A | 7/1995 | Jenkins et al. |
| 5,456,030 A | 10/1995 | Barone et al. |
| 5,465,513 A | 11/1995 | Sonerud |
| 5,467,542 A | 11/1995 | Hulden |
| 5,484,250 A | 1/1996 | Gilmore, Jr. et al. |
| 5,487,230 A | 1/1996 | Weyer |
| 5,494,396 A | 2/1996 | Geier et al. |
| 5,546,683 A | 8/1996 | Clark |
| 5,575,093 A | 11/1996 | Pratt et al. |
| 5,581,917 A | 12/1996 | Barden |
| 5,584,644 A | 12/1996 | Droegemueller |
| 5,597,283 A | 1/1997 | Jones |
| 5,611,158 A | 3/1997 | Pratt et al. |
| 5,618,157 A | 4/1997 | Pratt et al. |
| 5,621,987 A | 4/1997 | Pratt et al. |
| 5,634,735 A | 6/1997 | Horton et al. |
| 5,642,785 A | 7/1997 | Dam-Rasmussen |
| 5,685,689 A | 11/1997 | Schneider et al. |
| 5,692,325 A | 12/1997 | Kuzutani |
| 5,692,850 A | 12/1997 | Kimble et al. |
| 5,692,852 A | 12/1997 | Collins |
| 5,727,342 A | 3/1998 | Horton |
| 5,779,429 A | 7/1998 | Poole |
| 5,791,863 A | 8/1998 | Droegemueller |
| 5,802,753 A | 9/1998 | Raunisto |
| 5,813,822 A | 9/1998 | Pisco |
| 5,820,332 A | 10/1998 | Philips et al. |
| 5,865,594 A | 2/1999 | Kim |
| 5,890,871 A | 4/1999 | Woeman |
| 5,915,837 A | 6/1999 | Brown et al. |
| 5,951,192 A | 9/1999 | Collins |
| 5,966,850 A | 10/1999 | Horton |
| 5,974,706 A | 11/1999 | Kaczmarski et al. |
| 5,983,535 A | 11/1999 | Kaczmarski et al. |
| 6,000,154 A | 12/1999 | Berard et al. |
| 6,042,295 A | 3/2000 | Barden |
| 6,058,633 A | 5/2000 | Barden |
| 6,074,120 A | 6/2000 | Williams |
| 6,088,393 A | 7/2000 | Knee et al. |
| 6,088,938 A | 7/2000 | Logan |
| 6,088,939 A | 7/2000 | Logan |
| 6,108,951 A | 8/2000 | Renfrow et al. |
| 6,123,501 A | 9/2000 | Pisco |
| 6,132,130 A | 10/2000 | McCann |
| 6,132,131 A | 10/2000 | Nakamura et al. |
| 6,139,212 A | 10/2000 | Heiple |
| 6,154,989 A | 12/2000 | Kaczmarski et al. |
| 6,158,950 A | 12/2000 | Wilt et al. |
| 6,163,988 A | 12/2000 | Pratt et al. |
| 6,163,989 A | 12/2000 | Kaczmarski et al. |
| 6,168,369 B1 | 1/2001 | Bright et al. |
| 6,196,595 B1 | 3/2001 | Sonerud |
| 6,202,331 B1 | 3/2001 | Kobayashi |
| D440,983 S | 4/2001 | Miller et al. |
| 6,227,792 B1 | 5/2001 | Baker et al. |
| 6,231,296 B1 | 5/2001 | Blomgren |
| 6,233,852 B1 | 5/2001 | Pemberton |
| 6,241,455 B1 | 6/2001 | Schupback et al. |
| 6,254,331 B1 | 7/2001 | Pisco et al. |
| 6,260,357 B1 | 7/2001 | Goodfellow et al. |
| RE37,320 E | 8/2001 | Horton |
| RE37,339 E | 8/2001 | Horton |
| 6,301,811 B1 | 10/2001 | Gilmore, Jr. |
| 6,302,611 B1 | 10/2001 | De Gier et al. |
| 6,305,106 B1 | 10/2001 | McLellan |
| 6,308,442 B1 | 10/2001 | Naka et al. |
| 6,312,212 B1 | 11/2001 | Burlew, Jr. |
| 6,332,732 B1 | 12/2001 | Mantovani |
| 6,332,747 B1 | 12/2001 | Lee |
| 6,336,785 B1 | 1/2002 | Kunzman |
| 6,350,079 B1 | 2/2002 | Williams |
| D455,762 S | 4/2002 | Kaczmarski et al. |
| 6,364,561 B1 | 4/2002 | Doegemueller |
| 6,379,075 B1 | 4/2002 | Shamblin et al. |
| 6,385,872 B1 | 5/2002 | Mieger et al. |
| 6,386,822 B1 | 5/2002 | Burr |
| 6,408,875 B1 | 6/2002 | Nishikawa et al. |
| 6,422,805 B1 | 7/2002 | Miller |
| 6,428,265 B1 | 8/2002 | Gilmore, Jr. |
| 6,431,785 B1 | 8/2002 | Melander |
| 6,438,875 B1 | 8/2002 | Kimble et al. |
| 6,481,124 B1 | 11/2002 | Miller et al. |
| 6,487,800 B1 | 12/2002 | Evans et al. |
| 6,493,967 B2 | 12/2002 | Holmes et al. |
| 6,499,904 B2 | 12/2002 | Nye |
| 6,508,616 B2 | 1/2003 | Hung |
| 6,513,266 B1 | 2/2003 | Ijiri |
| 6,513,268 B2 | 2/2003 | Lee et al. |
| 6,533,528 B2 | 3/2003 | Degen et al. |
| 6,533,529 B2 | 3/2003 | Waggoner |
| 6,539,650 B2 | 4/2003 | Kaczmarski et al. |
| 6,606,805 B2 | 8/2003 | Kimble et al. |
| 6,615,514 B2 | 9/2003 | Ruiz |
| 6,625,909 B1 | 9/2003 | Miller et al. |
| 6,629,811 B1 | 10/2003 | Husson |
| 6,644,885 B2 | 11/2003 | Dam-Rasmussen |
| 6,655,053 B1 | 12/2003 | Cummings |
| 6,658,770 B2 | 12/2003 | Heiple |
| 6,659,708 B2 | 12/2003 | Heiple |
| 6,659,709 B1 | 12/2003 | Anderson |
| 6,688,801 B2 | 2/2004 | Husson |
| 6,691,438 B2 | 2/2004 | Fatemi |
| 6,709,224 B2 | 3/2004 | Heiple |
| 6,718,663 B1 | 4/2004 | Geraghty |
| 6,725,584 B2 | 4/2004 | Inoue et al. |
| 6,811,371 B2 | 11/2004 | Mantovani |
| 6,812,851 B1 | 11/2004 | Dukach et al. |
| 6,813,851 B2 | 11/2004 | Mieger et al. |
| 6,857,842 B2 | 2/2005 | Heiple |
| 6,877,259 B2 | 4/2005 | Nishimura et al. |
| 6,881,002 B2 | 4/2005 | Fatemi |
| 6,886,279 B2 | 5/2005 | Kimble |
| 6,899,509 B1 | 5/2005 | Mailleux |
| 6,902,346 B2 | 6/2005 | Steig, Jr. et al. |
| 6,922,926 B2 | 8/2005 | Miller et al. |
| 7,047,866 B2 | 5/2006 | Fatemi et al. |
| 7,367,256 B2 | 5/2008 | Fatemi et al. |
| 7,426,796 B2 | 9/2008 | Cunningham et al. |
| 7,430,955 B2 | 10/2008 | Bitter |
| 7,455,494 B2 | 11/2008 | Krieger |
| 7,648,305 B2 | 1/2010 | Beales |
| 7,654,019 B2 | 2/2010 | Yeager et al. |
| 7,797,862 B2 | 9/2010 | Daraie et al. |
| 7,828,070 B2 | 11/2010 | Calvert et al. |
| 7,984,575 B2 | 7/2011 | Robl et al. |
| 8,262,310 B2 | 9/2012 | Sikorski et al. |
| 8,281,506 B2 | 10/2012 | Stefek et al. |
| 8,556,534 B2 * | 10/2013 | Lim et al. .................. 403/322.3 |
| 2001/0026729 A1 | 10/2001 | Trowbridge |
| 2001/0053323 A1 | 12/2001 | Godwin et al. |

(56) References Cited

U.S. PATENT DOCUMENTS

| | | |
|---|---|---|
| 2002/0066215 A1 | 6/2002 | Kaczmarski et al. |
| 2002/0071754 A1 | 6/2002 | Fatemi |
| 2002/0098032 A1 | 7/2002 | Nye |
| 2002/0136597 A1 | 9/2002 | Nishikawa et al. |
| 2002/0157287 A1 | 10/2002 | Mieger et al. |
| 2002/0170211 A1 | 11/2002 | Lee et al. |
| 2002/0174575 A1 | 11/2002 | Inoue et al. |
| 2002/0176772 A1 | 11/2002 | Hung |
| 2002/0178625 A1 | 12/2002 | Kimble et al. |
| 2003/0005605 A1 | 1/2003 | Kaczmarski et al. |
| 2003/0095858 A1 | 5/2003 | Mantovani |
| 2003/0099507 A1 | 5/2003 | Fatemi |
| 2003/0103806 A1 | 6/2003 | Short |
| 2003/0131505 A1 | 7/2003 | Heiple |
| 2003/0133779 A1 | 7/2003 | Heiple |
| 2003/0154636 A1 | 8/2003 | Miller et al. |
| 2003/0175072 A1 | 9/2003 | Steig, Jr. et al. |
| 2003/0204972 A1 | 11/2003 | Cunningham et al. |
| 2003/0233773 A1 | 12/2003 | Mieger et al. |
| 2004/0000077 A1 | 1/2004 | Fatemi |
| 2004/0028515 A1 | 2/2004 | Martin |
| 2004/0057784 A1 | 3/2004 | Geraghty |
| 2004/0076504 A1 | 4/2004 | Geraghty |
| 2004/0165979 A1 | 8/2004 | Fatemi |
| 2004/0184875 A1 | 9/2004 | Mieger et al. |
| 2004/0218971 A1 | 11/2004 | Lim et al. |
| 2004/0247382 A1 | 12/2004 | Leemans et al. |
| 2005/0169703 A1 | 8/2005 | Fatemi |
| 2005/0204591 A1 | 9/2005 | Mieger et al. |
| 2005/0214105 A1 | 9/2005 | Steig, Jr. et al. |
| 2007/0166143 A1 | 7/2007 | Hart et al. |
| 2009/0007465 A1 | 1/2009 | Robl et al. |
| 2009/0282712 A1 | 11/2009 | Pruszynski |
| 2009/0311086 A1 | 12/2009 | Steig, Jr. et al. |
| 2010/0061799 A1 | 3/2010 | Hill |
| 2010/0192425 A1 | 8/2010 | Miller et al. |
| 2010/0232920 A1 | 9/2010 | Calvert et al. |
| 2011/0010915 A1 | 1/2011 | Calvert et al. |
| 2011/0091267 A1 | 4/2011 | Hill |
| 2011/0209608 A1 | 9/2011 | Stefek et al. |
| 2013/0000292 A1 | 1/2013 | Elder et al. |
| 2013/0008153 A1 | 1/2013 | Stefek et al. |
| 2013/0160268 A1 | 6/2013 | Parker et al. |

FOREIGN PATENT DOCUMENTS

| | | |
|---|---|---|
| JP | 10082066 | 3/1998 |
| JP | 11181819 | 7/1999 |
| JP | 2000001872 | 1/2000 |
| NZ | 233302 | 4/1990 |
| WO | 2011033253 | 9/2009 |
| WO | 2011033253 | 3/2011 |

* cited by examiner

QUICK COUPLER

TECHNICAL FIELD

The present disclosure relates to a coupler for connecting an implement to a machine. In particular, the present disclosure relates to a quick coupler for connecting and disconnecting a tool, such as a bucket or shovel, to a machine such as a backhoe, excavator, or similar machine.

BACKGROUND

A quick coupler is fixed to an arm of a machine for connecting and disconnecting implements to the arm. For example, a quick coupler can be attached to the arm of a machine such as a backhoe or an excavator to connect and disconnect the arm and implements such as buckets, hammers, rippers, and grapples. Such quick couplers are advantageous because they allow a machine operator to change quickly from one implement to another. Thus, the use of a quick coupler makes the machine more efficient and versatile.

Several different types of quick couplers have been employed in the past. One exemplary quick coupler is disclosed in international patent application publication number WO2011/033253, which discloses a fully automatic coupler for an excavator arm. The coupler disclosed in WO2011/033253 includes a pair of jaws configured to receive corresponding pins on an implement. Each of the jaws is coupled to a corresponding latch mechanism. The first latching mechanism is configured to move to a closed or latched position when the coupler is in its normal configuration, and move to an open or unlatched position when the coupler is inverted. The second latch mechanism is connected to a hydraulic actuator configured to open and close the second jaw.

One shortcoming of having a hydraulic actuator controlling a jaw of the coupler is that should the actuator fail, the jaw could then open unexpectedly, causing the implement pins to become disconnected from the coupler. The present disclosure presents a quick coupler including an over-center locking system to position the jaws from an open position to a closed position and to retain the jaws in the closed position. In the closed position, the linkages in the locking system, are configured so that linkages resist further movement, thereby retaining the jaws in the closed position. An actuator may be provided to engage and disengage the locking system. However, because the actuator is placed outside of the load path between the implement and the quick coupler frame, the actuator need not be sized to withstand the implement load and the likelihood of disengagement is reduced over prior designs.

SUMMARY OF THE INVENTION

One aspect of the present disclosure includes a quick coupler for connecting an implement to a machine. The quick coupler including a frame, a first jaw pivotally connected to the frame and movable between an open position and a closed position, a second jaw pivotally connected to the frame and movable between an open position and a closed position, and a lock system connected to the first jaw and the second jaw. The lock system includes a first linkage pivotally connected to the frame and to the first jaw, a second linkage pivotally connected to the first linkage and to the second jaw, and a drive member connected to the first linkage and configured to selectively operate the lock system between an unlocked position and a locked position.

Another aspect of the present disclosure includes a quick coupler for connecting an implement to a machine. The implement includes a first and a second spaced-apart connection pins. The quick coupler includes a frame, a first jaw pivotally connected to the frame and movable between an open position and a closed position, the first jaw being configured to engage the first connection pin in the closed position. The quick coupler also includes a second jaw pivotally connected to the frame and movable between an open position and a closed position, the second jaw being configured to engage the second connection pin in the closed position. The quick coupler further includes a lock system connected to the first jaw and the second jaw. The lock system includes a first linkage pivotally connected to the frame and to the first jaw. The first linkage includes an actuator arm having a first end pivotally connected to a drive member, a first rocker pivotally connected to a second end of the actuator arm; and a second rocker pivotally connected to the frame and to the first end of the actuator arm. The lock system also includes a second linkage pivotally connected to the first linkage and to the second jaw. The second linkage includes a locking bar having a first end pivotally connected to the first rocker, and a connecting link pivotally connected to a second end of the locking bar and to the second jaw. The drive member may be connected to the first linkage and configured to selectively operate the lock system between an unlocked position and a locked position. An actuator may be provided that is pivotally connected to the frame and to the drive member.

Another aspect of the present disclosure includes a method for connecting an implement to a machine, the implement having a pair of spaced-apart connection pins, the method including the steps of: providing a quick coupler attached to the machine, the quick coupler comprising a frame, a first jaw and a second jaw disposed within the frame and operable between an open position and a closed position, a lock system connected to the first jaw and the second jaw, the lock system including a drive member, wherein the first jaw and the second jaw are in the open position; positioning the quick coupler so that the first jaw is located proximate to the first connection pin and the second jaw is located proximate to the second connection pin; and moving the first jaw and the second jaw to the closed position and locking the first and second jaws in the closed position by moving the drive member in a downward direction.

DETAILED DESCRIPTION

Figure 1:
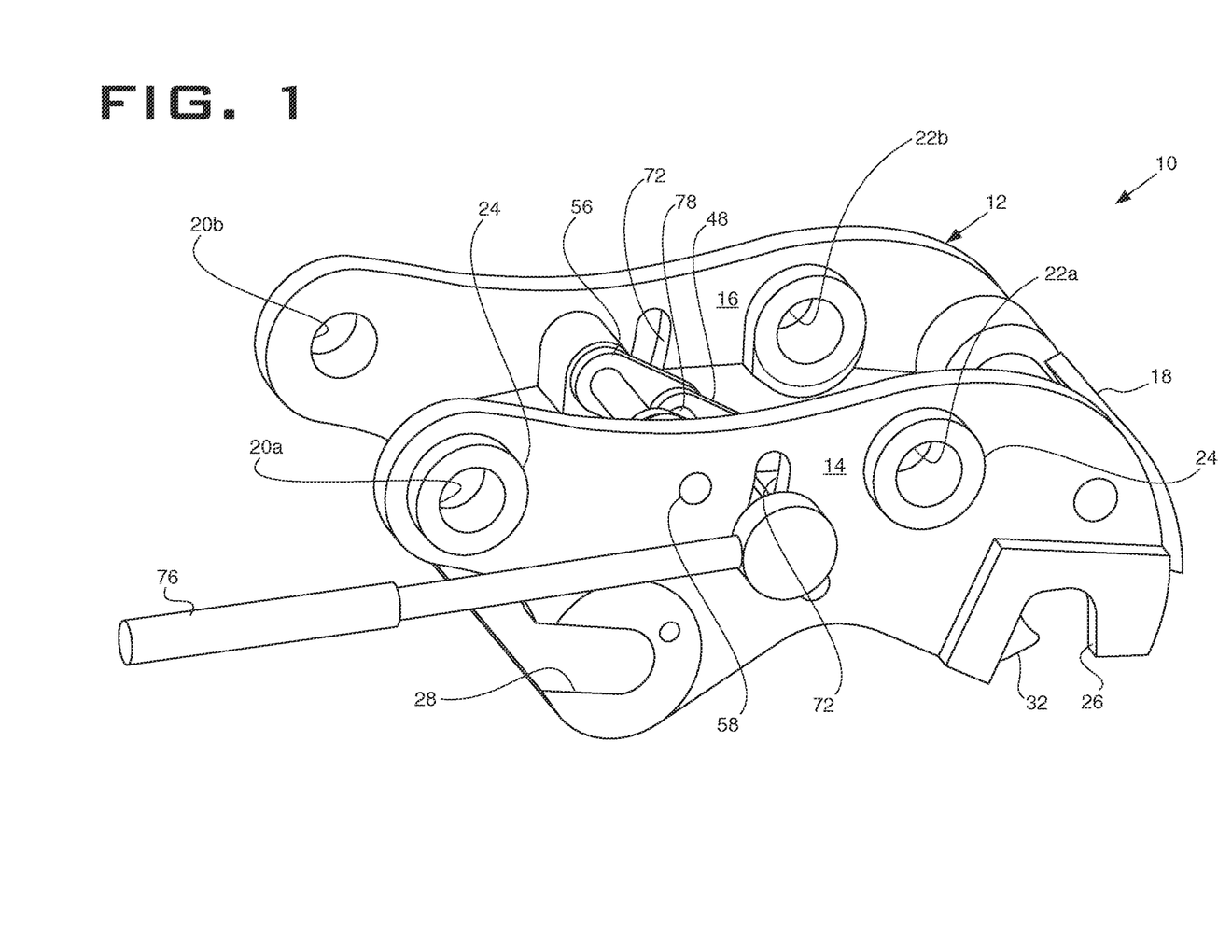
FIG. 1 is a perspective view of an embodiment of a quick coupler of the present disclosure.
Figure 6:
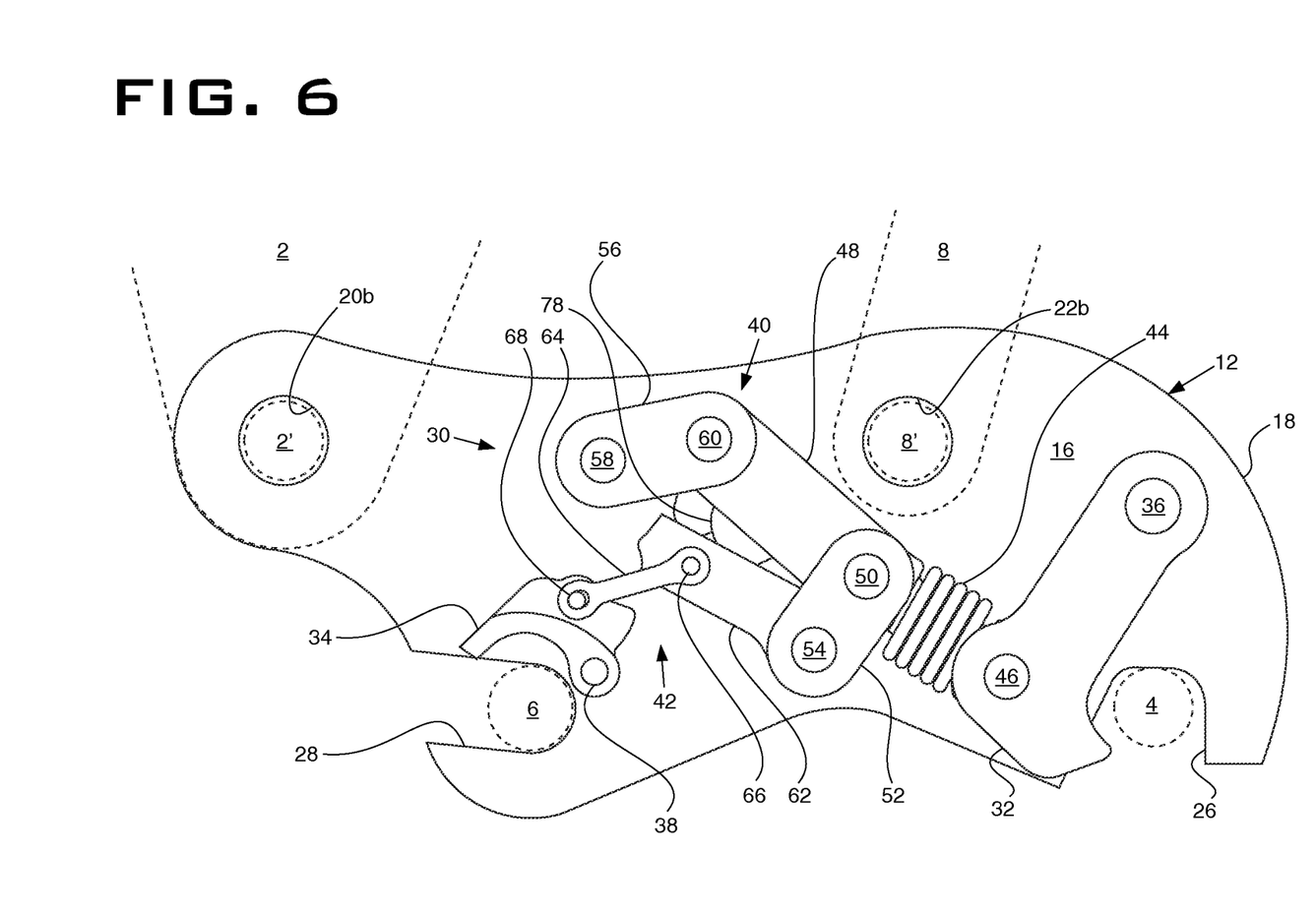
FIG. 6 is a sectional side view of the quick coupler of FIG. 1, showing the locking system in an unlocked position.
Figure 7:
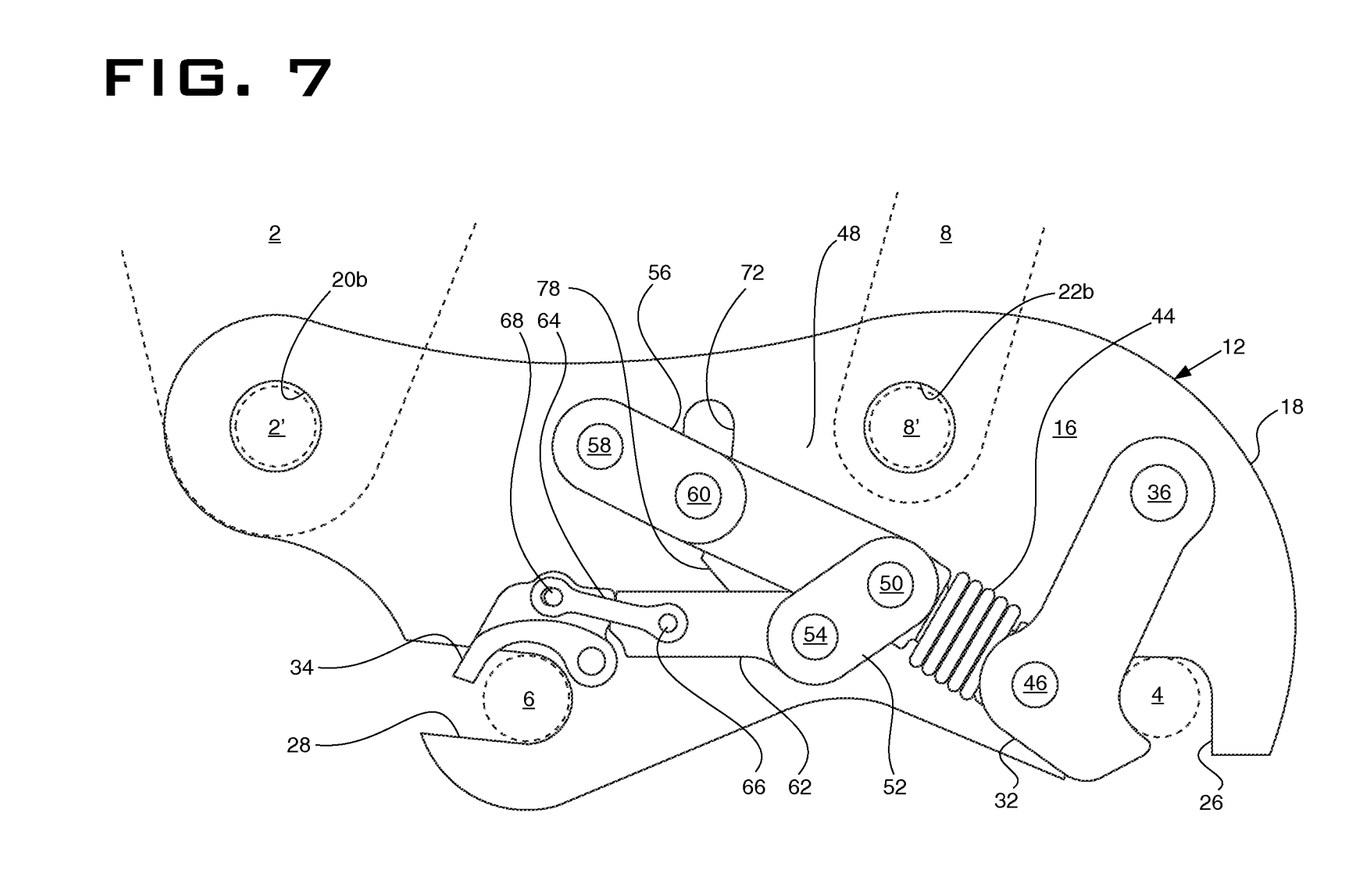
FIG. 7 is a sectional side view of the quick coupler of FIG. 6, showing the locking system in a locked position.

Referring to FIG. 1, a quick coupler 10 is disclosed for connecting an implement (not shown) to a support arm or a stick 2 of a machine such as a backhoe or an excavator (not shown). The implement may be of any kind known in the art, including, but not limited to, a bucket, a shovel, a hammer, a saw, mechanical shears, and the like. As shown in FIGS. 6 and 7, the implement may include pins 4, 6 attached to the implement, spaced apart, and oriented in a generally horizontal configuration when the implement is resting on the ground.

For example, pins 4, 6 may be supported by and span between spaced apart brackets on the implement in a generally parallel configuration.

Referring again to FIG. 1, the quick coupler 10 may include a frame 12. The frame 12 may include a first side plate 14, a second side plate 16, and a cross plate 18. The frame 12 may further include two sets of aligned pin openings 20a, 20b and 22a, 22b in the first side plate 14 and the second side plate 16. As shown in FIGS. 6 and 7, aligned pin openings 20a, 20b may be configured to receive a pin 2' attached to the stick 2 of the machine. Likewise, aligned pin openings 22a, 22b may be configured to receive a pin 8' attached to the power link 8. A collar 24 may be disposed about each of the aligned pin openings 20a, 20b and 22a, 22b on an outer surface of first side plate 14 and second side plate 16. Thus, the stick 2 and the power link 8 may be operably connected to quick coupler 10 about pins 2' and 8'.

Recesses 26, 28 may be provided in the frame 12 configured to engage implement pins 4, 6, respectively. In the exemplary embodiment, recesses 26, 28 may be positioned at a lower portion of the frame 12 while the stick 2 and power link 8 may be attached to the top of the frame 12.

Quick coupler 10 may further include an over-center locking system 30 disposed within the frame 12 between the first side plate 14 and the second side plate 16. As best shown in FIGS. 6 and 7, the locking system may include a first jaw 32 configured to retain first implement pin 4, and a second jaw 34 configured to retain second implement pin 6. First jaw 32 and second jaw 34 may be pivotally connected to the frame 12 by first jaw pivot 36 and second jaw pivot 38. First jaw pivot 36 may be configured as a pin attached to the frame 12 between the first side plate 14 and the second side plate 16 proximate to the first recess 26, allowing the first jaw 32 to rotate freely about the first jaw pivot 36. Similarly second jaw pivot 38 may be configured as a pin attached to the frame 12 between the first side plate 14 and the second side plate 16 proximate to the second recess 28, allowing the second jaw 34 to rotate freely about the second jaw pivot 38.

Figure 2:
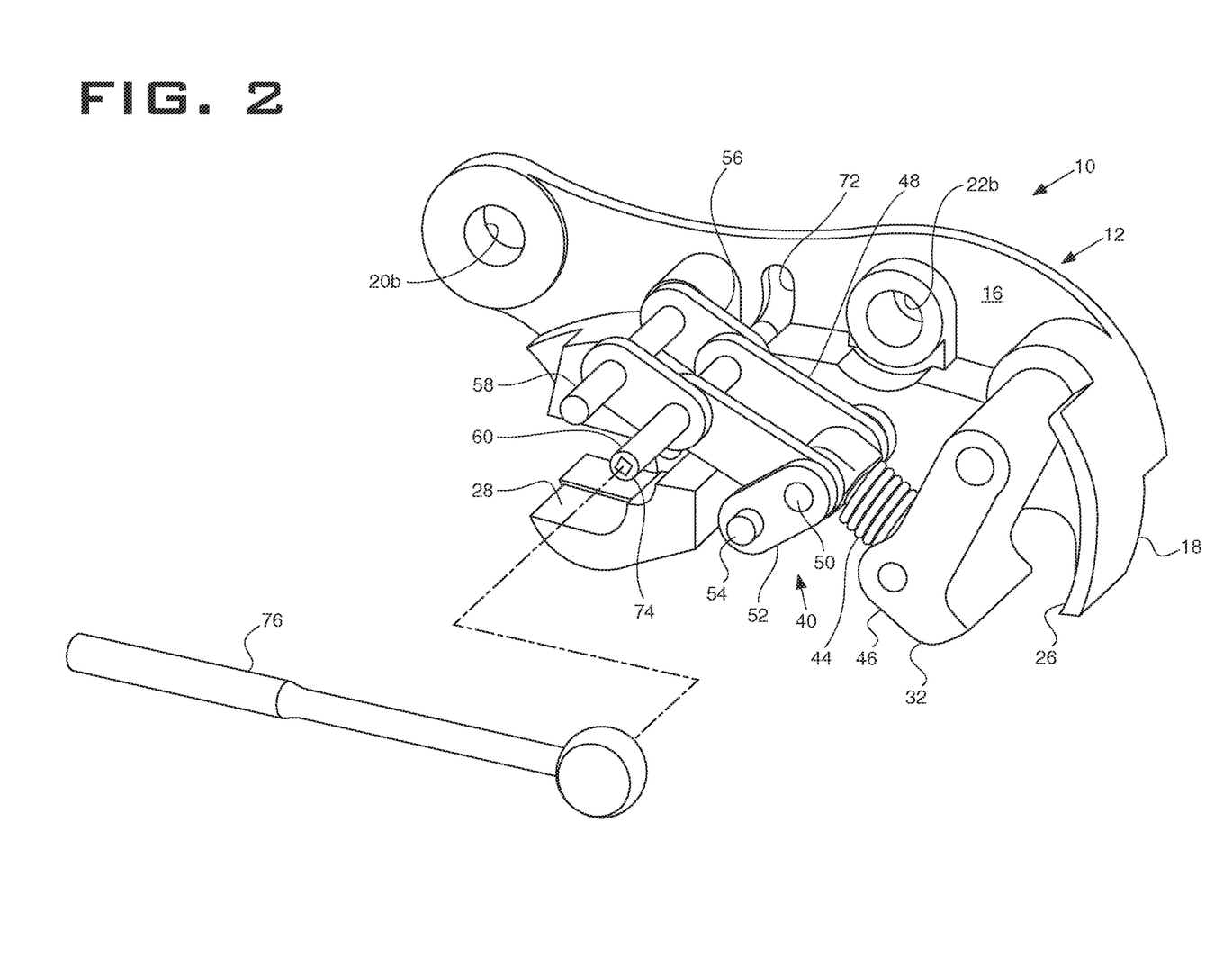
FIG. 2 is an upper perspective section view of the quick coupler of FIG. 1 showing a first linkage.
Figure 3:
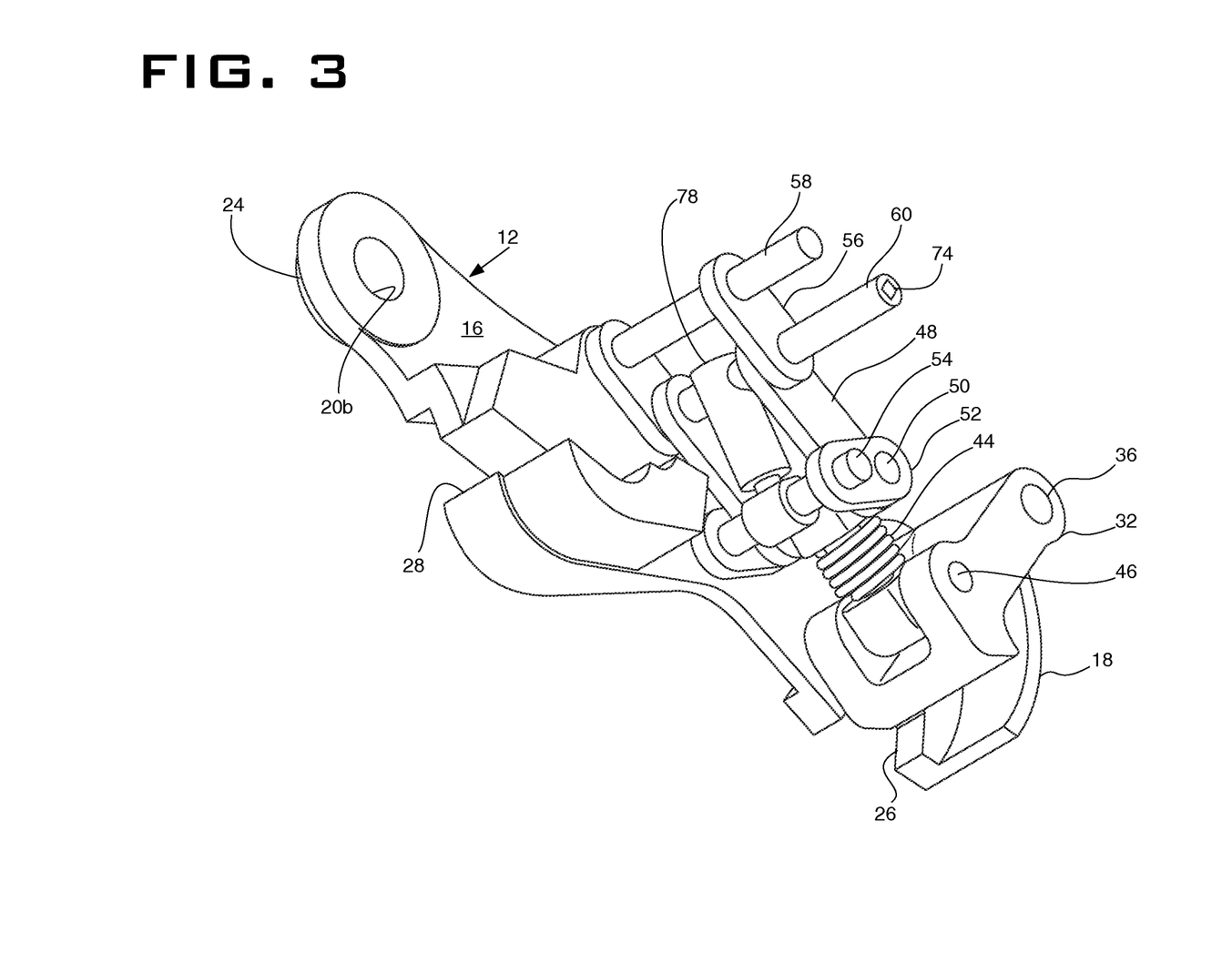
FIG. 3 is a lower perspective section view of the quick coupler of FIG. 2.

The locking system 30 may further include a first linkage 40 operably connected to the first jaw 32 and a second linkage 42 operably connected to the second jaw 34. Referring to FIGS. 2 and 3, the first linkage 40 may include a spring 44 pivotally connected to the first jaw 32 at a spring pivot 46 spaced apart from the first jaw pivot 36. The spring 44 may also be attached to one end of an actuator arm 48 at an actuator pivot 50. A first rocker 52 may be pivotally attached to the frame 12 at a first rocker pivot 54. The first rocker 52 may also be pivotally connected to the actuator arm at the actuator pivot 50. A second rocker 56 may be pivotally connected to the fame 12 at a second rocker pivot 58. The second rocker 56 may also be pivotally connected to the actuator arm 48 at a drive pin 60.

Figure 4:
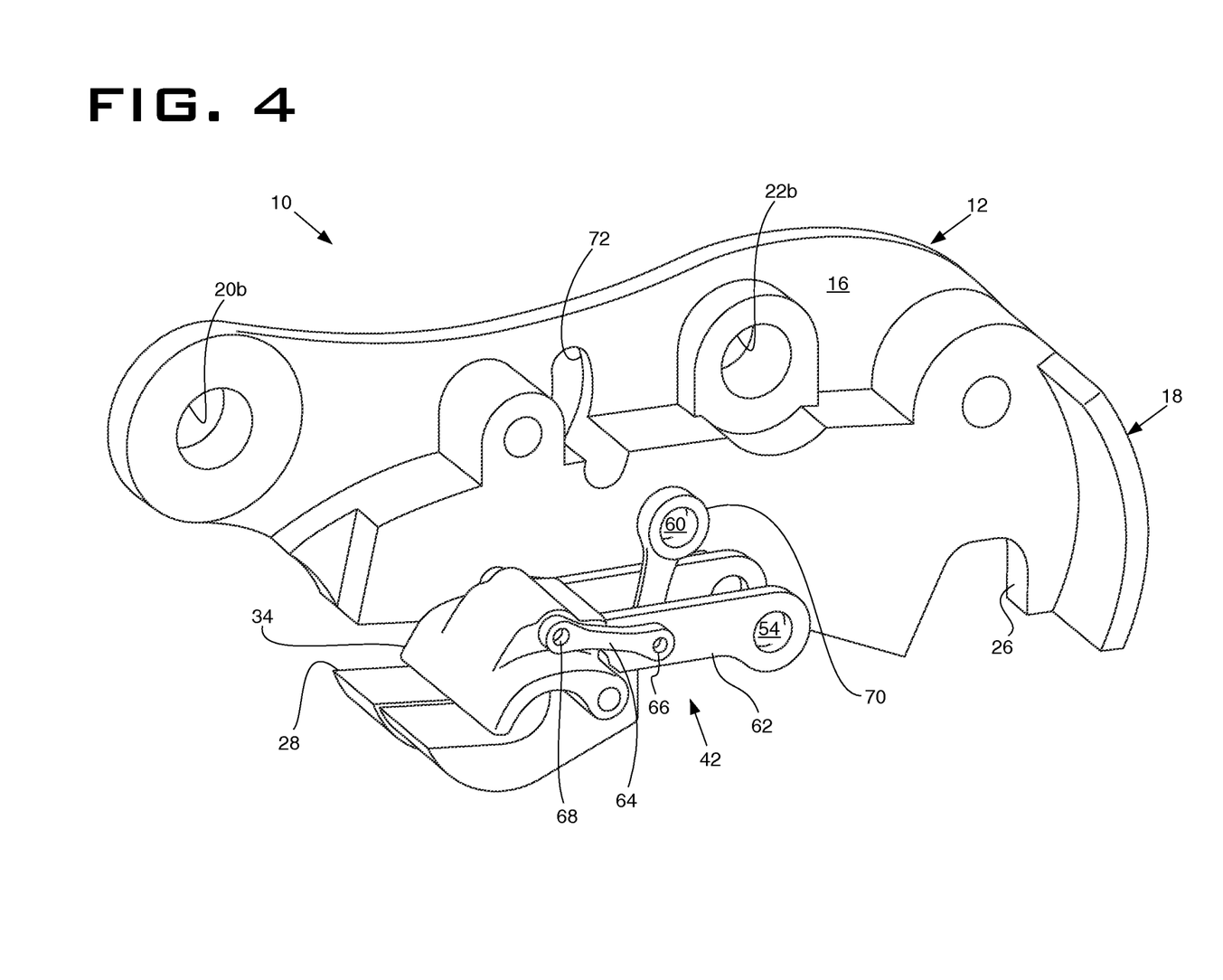
FIG. 4 is an upper perspective section view of the quick coupler of FIG. 1 showing a second linkage.

Referring to FIG. 4, the second linkage 42 may include a locking bar 62. One end of locking bar 62 may be pivotally connected to the frame 12 at the first rocker pivot 54. One end of a connecting link 64 may be pivotally attached to the other end of locking bar 62 at pivot 66. The other end of connecting link 64 may be pivotally connected to the second jaw 34 at pivot 68. Second linkage 42 may also include an actuator link 70, which may be pivotally connected at one end to the locking bar 62 at pivot 66, and at the other end, pivotally connected to drive pin 60.

In one embodiment of the present disclosure, the quick coupler may be configured for manual operation. In this embodiment, the drive pin 60 may be configured to cooperate with a slot 72 provided in the frame 12. In the exemplary embodiment, a slot 72 may be provided in each of the first side plate 14 and the second side plate 16. The slot 72 may be of arcuate configuration, having a radius of curvature corresponding to the distance from second rocker pivot 58 to drive pin 60. The drive pin may include a socket 74 configured to cooperate with a tool 76, such as a ratchet, wrench, handle, etc. In the exemplary embodiment, the drive pin 60 is shown to include a square socket configured to receive a square-drive ratchet, as shown in FIGS. 1 and 2.

Figure 5:
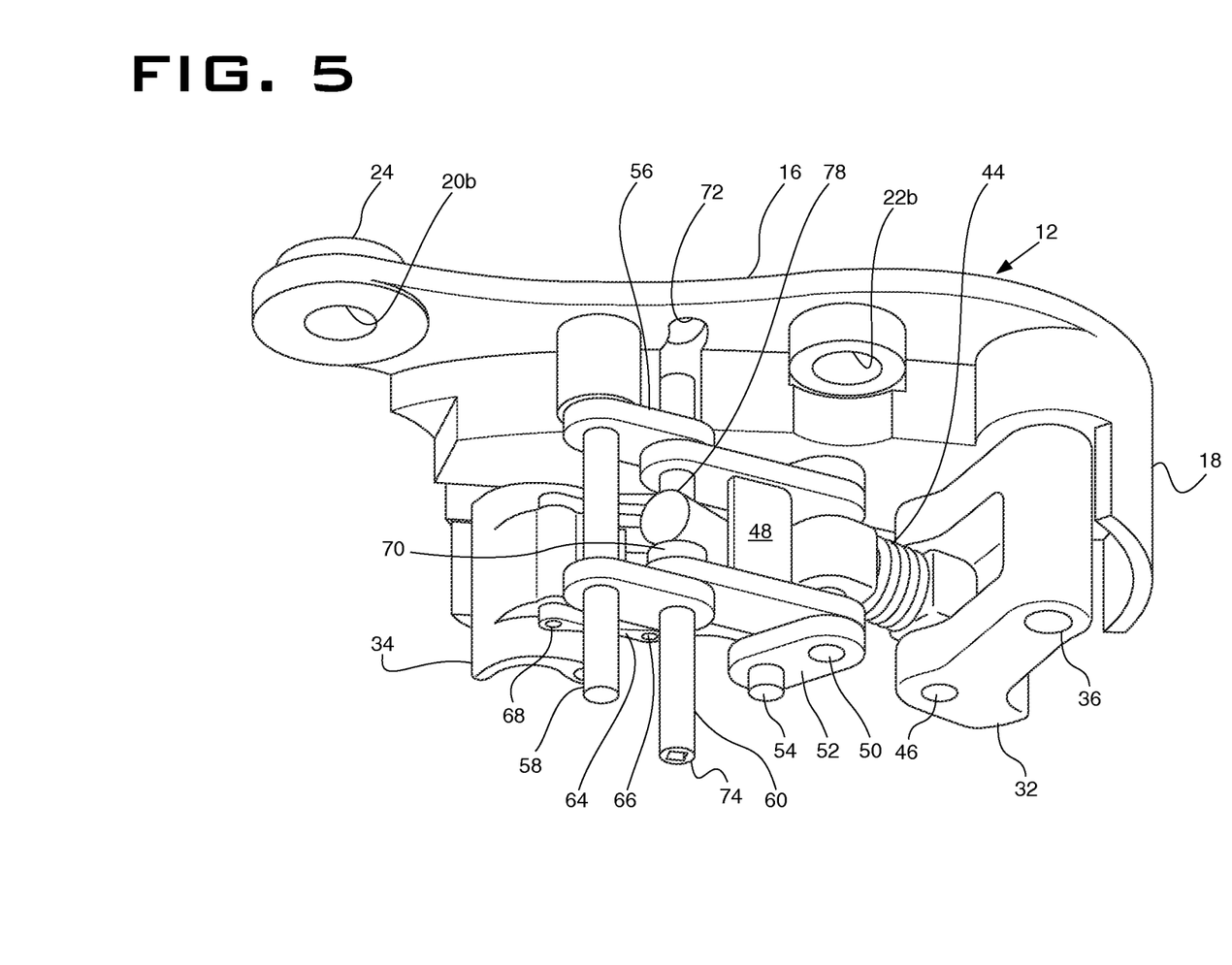
FIG. 5 is a top perspective section view of an embodiment of a quick coupler of FIG. 1 showing the first and second linkages.

In another embodiment of the present disclosure, the quick coupler 10 may be configured for automatic operation. In this exemplary embodiment, an actuator 78 may be pivotally connected to the first rocker pivot 54 and to the drive pin 60, as best shown in FIGS. 3 and 5. In this exemplary embodiment, the actuator is configured as a hydraulic piston and cylinder. The actuator 78 may be configured such that when the over-center locking system 30 is in an unlocked position, the actuator 78 moves the drive pin 60 in a downward direction to engage locking system 30 and placing the first jaw 32 and the second jaw 34 in the closed position. Similarly, when the locking system 30 is in a locked configuration, actuator 78 may move drive pin 60 upward to release locking system 30.

In operation, the implement is subjected to outside forces and loads, which are transmitted through the quick coupler 10 to the machine. The load may be transmitted through a path defined by the first and second jaws 32, 34, and the first and second linkages 40, 42 to the frame 12 of the quick coupler. The actuator 78 may be positioned in the quick coupler 10 in relation to the first and second linkages 40, 42 so that it is outside the load path and the outside forces and loads are not transmitted through the actuator. The actuator 78 also may be configured as a hydraulic piston and cylinder configured to be attached to a hydraulic power system on the machine.

Industrial Applicability

The present disclosure is applicable to machines, such as backhoes, excavators, and similar machines that may be used to perform multiple functions. For example, a backhoe or an excavator may be used for excavation or digging in soil, rock, or other material. For such digging operations, the machine typically may use a bucket or shovel, however, different types of buckets may be required for different materials. Additionally, a machine may be used to perform different tasks, for which other implements may need to be attached to the machine. Such other implements may include, for example, hammers, grapples, and similar tools.

In operation, the quick coupler 10 may be first attached to the arm or stick 2 of a machine by a pin 2' which may be inserted through aligned pin openings 20a, 20b formed in the first and second side plates 14, 16. The quick coupler may also be attached to the power link 8 of the machine by a pin 8' which may be inserted through aligned pin openings 22a, 22b formed in the first and second side plates 14, 16.

To attach an implement to the quick coupler 10, an operator maneuvers the stick 2 to position the quick coupler 10 over the implement. The quick coupler 10 is configured such that first and second jaws 32, 34 are each in an open position allowing access to first and second recesses 26, 28. The quick coupler 10 may be moved onto the implement so that pin 4 is received into recess 26 and pin 6 is received into recess 28.

Referring to FIGS. 1 and 2, to lock the quick coupler 10 to the implement, an operator may attach a tool 76 to drive pin 60 enabling the operator to manually push drive pin 60 downwardly until drive pin 60 is below an axis defined by the actuator pivot 50 and the second rocker pivot 58. In an alternative embodiment, the actuator 78 may provide a downward force against drive pin 60 to engage locking system 30. Actuator arm 48 rotates counterclockwise and second rocker 56 rotates clockwise as drive pin 60 is moved downwardly. Actuator arm 48 causes first jaw 34 to rotate against pin 4 and compresses spring 44. In the locked position, the force generated by spring 44 acts drive pin 60 in a direction further over center securing the locking system 30 in the locked position.

Also, as drive pin 60 is moved downward, the second linkage 42 operates to place connecting link 64 and pivot 66 into an over center arrangement with respect to pivot 68, thereby locking the second jaw 34 against pin 6. In this configuration, locking bar 62 causes connecting link 64 to rotate clockwise about pivot 68 until pivot 66 is below a line defined by the first rocker pivot 54 and pivot 68, thereby placing connecting link in an over center position with respect to second jaw 34.

In an embodiment of the present disclosure, the locking system 30 may be released from a locked configuration to an unlocked configuration by moving drive pin 60 upwardly. In one embodiment, an operator may attach a tool 76 to the drive pin 60 and manually lift the drive pin 60 thereby releasing locking system 30. In an alternative embodiment, the actuator 78 may provide an upward force against drive pin 60 to release locking system 30.

It will be apparent to those skilled in the art that various modifications can be made to the disclosed quick coupler without departing from the scope of the invention. Other embodiments of the quick coupler will be apparent to those skilled in the art from consideration of the specification and the practice of the quick coupler disclosed herein. For example, although the disclosed quick coupler has been described as including a manual drive feature and an automatic drive feature, nevertheless, it is contemplated that a similar quick coupler may include both manual and automatic drive features. It is intended that the specification and examples be considered exemplary only, with a true scope being indicated by the following claims and their equivalents.

What is claimed is:

1. A quick coupler for connecting an implement to a machine, the quick coupler comprising:
    a frame;
    a first jaw pivotally connected to the frame and movable between an open position and a closed position;
    a second jaw pivotally connected to the frame and movable between an open position and a closed position; and
    a lock system connected to the first jaw and the second jaw, the lock system comprising:
        a first linkage pivotally connected to the frame and to the first jaw,
        a second linkage pivotally connected to the first linkage and to the second jaw, and
        a drive member connected to the first linkage and configured to selectively operate the lock system between an unlocked position and a locked position;
        wherein the first linkage comprises an actuator having a first end pivotally connected to the drive member, a first rocker pivotally connected to a second end of the actuator; and a second rocker pivotally connected to the frame and to the first end of the actuator;
        wherein the second linkage comprises a locking bar having a first end pivotally connected to the first rocker; and a connecting link pivotally connected to a second end of the locking bar and to the second jaw;
        wherein the first rocker is pivotally connected to a second end of the actuator and defines a first point, the second rocker is pivotally connected to the frame and defines a second point, the first linkage is configured so that the drive member is above a line between the first point and the second point when the lock system is in an unlocked position and below the line between the first point and the second point when the lock system is in the locked position.

2. The quick coupler of claim 1, further comprising a spring pivotally attached to the second end of the actuator arm and to the first jaw.

3. The quick coupler of claim 1, wherein the locking bar being pivotally connected to the first rocker defines a third point, and wherein the connecting link being pivotally connected to the second jaw defines a fourth point, and wherein the connecting link being pivotally connected to the locking bar defines a fifth point, the second linkage being configured so that the fifth point, the second linkage being configured so that the fifth point is above a line between the third point and the fourth point when the lock system is in an unlocked position and below the line between the third point and the fourth point when the lock system is in the locked position.

4. The quick coupler of claim 1 wherein the actuator is pivotally connected to the frame and to the drive member, wherein the actuator is located outside of a load path between the first and second jaws and the frame of the quick coupler.

5. The quick coupler of claim 4 wherein the actuator is configured as a hydraulic piston and cylinder.

6. The quick coupler of claim 5 wherein the actuator is configured for connection to a hydraulic system on the machine.

7. A quick coupler for connecting an implement to a machine, the implement having a first and a second spaced-apart connection pins, the quick coupler comprising:
    a frame;
    a first jaw pivotally connected to the frame and movable between an open position and a closed position, the first jaw being configured to engage the first connection pin in the closed position;
    a second jaw pivotally connected to the frame and movable between an open position and a closed position, the second jaw being configured to engage the second connection pin in the closed position; and
    a lock system connected to the first jaw and the second jaw, the lock system comprising:
        a first linkage pivotally connected to the frame and to the first jaw, the first linkage including an actuator having a first end pivotally connected to a drive member, a first rocker pivotally connected to a second end of the actuator, and a second rocker pivotally connected to the frame and to the first end of the actuator,
        a second linkage pivotally connected to the first linkage and to the second jaw, the second linkage including a locking bar having a first end pivotally connected to the first rocker, and a connecting link pivotally connected to a second end of the locking bar and to the second jaw,
        wherein the drive member is configured to selectively operate the lock system between an unlocked position and a locked position;
        wherein the actuator is located outside of a load path between the first and second jaws and the frame of the quick coupler;

wherein the first rocker is pivotally connected to a second end of the actuator and defines a first point, and wherein the second rocker is pivotally connected to the frame and defines a second point, the first linkage being configured so that the drive member is configured to be above a line between the first point and the second point when the lock system is in an unlocked position and below the line between the first point and the second point when the lock system is in the locked position.

8. The quick coupler of claim 7, wherein the actuator is pivotally connected to the frame and to the drive member.

9. The quick coupler of claim 8, wherein the actuator is configured as a hydraulic piston and cylinder.

10. The quick coupler of claim 8, wherein the actuator is configured as a hydraulic piston and cylinder.

11. The quick coupler of claim 7, wherein the locking bar being pivotally connected to the first rocker defines a third point, and wherein the connecting link being pivotally connected to the second jaw defines a further point, and wherein the connecting link being pivotally connected to the locking bar defines a fifth point, the second linkage being configured so that the fifth point is above a line between the third point and the fourth point when the lock system is in an unlocked position and below the line between the third point and the fourth point when the lock system is in the locked position.

* * * * *

UNITED STATES PATENT AND TRADEMARK OFFICE
CERTIFICATE OF CORRECTION

PATENT NO. : 8,974,137 B2  
APPLICATION NO. : 13/334315  
DATED : March 10, 2015  
INVENTOR(S) : Parker et al.

Page 1 of 1

It is certified that error appears in the above-identified patent and that said Letters Patent is hereby corrected as shown below:

In the specification

Column 4, line 42, delete "Industrial Applicability" and insert -- INDUSTRIAL APPLICABILITY --.

Signed and Sealed this
Fourteenth Day of June, 2016

Michelle K. Lee
*Director of the United States Patent and Trademark Office*